(12) United States Patent
Lindquist et al.

(10) Patent No.: US 6,172,156 B1
(45) Date of Patent: *Jan. 9, 2001

(54) COHESIVELY FAILING HOT MELT PRESSURE SENSITIVE ADHESIVE

(75) Inventors: Jeffrey S. Lindquist, Cottage Grove; Lisa L. Ryan, Maple Grove, both of MN (US)

(73) Assignee: H. B. Fuller Licensing & Financing, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/873,996

(22) Filed: Jun. 12, 1997

Related U.S. Application Data

(63) Continuation-in-part of application No. 08/676,864, filed on Jul. 3, 1996, now Pat. No. 5,741,840.

(51) Int. Cl.[7] .............................. C08L 53/02; C08L 93/04; C08K 5/01
(52) U.S. Cl. ......................... 524/505; 524/271; 524/274; 524/474; 524/484; 524/485; 524/486; 524/499; 525/98; 525/99
(58) Field of Search ..................................... 524/271, 274, 524/474, 484, 485, 486, 490, 491, 499, 505; 525/98, 99

(56) References Cited

U.S. PATENT DOCUMENTS

| 4,096,203 | 6/1978 | St. Clair | 524/505 |
|---|---|---|---|
| 4,866,911 | 9/1989 | Grindrod et al. | 53/432 |
| 5,167,974 | 12/1992 | Grindrod et al. | 426/127 |
| 5,418,052 | 5/1995 | Sugie et al. | 428/261 |
| 5,420,203 | 5/1995 | Dillman et al. | 525/98 |
| 5,741,840 | * 4/1998 | Lindquist et al. | 524/271 |

FOREIGN PATENT DOCUMENTS

| 0 355 468 A1 | 7/1989 | (EP) . |
|---|---|---|
| 0629 676 A1 | 6/1994 | (EP) . |
| 0 659 861 A1 | 12/1994 | (EP) . |
| 0 757 066 A1 | 7/1996 | (EP) . |

OTHER PUBLICATIONS

Article on *High–Performance Thermoplastic Rubber "Septon™"* by Kuraray Co., Ltd.

* cited by examiner

*Primary Examiner*—Peter A. Szekely
(74) *Attorney, Agent, or Firm*—Carolyn A. Fischer

(57) ABSTRACT

A hot melt pressure sensitive adhesive comprising a) from about 15% to about 40% by weight of a block copolymer having a coupling efficiency of less than about 75%; b) from about 20% to about 50% by weight of a tackifying resin selected from the group consisting of those tackifying resins having a softening point of less than about 100° C.; c) from about 30% to about 50% by weight of a plasticizing oil; and d) up to about 15% of a compatible polymer wherein the total polymer content does not exceed 40% by weight of the adhesive wherein the hot melt pressure sensitive adhesive fails cohesively during use.

14 Claims, No Drawings

COHESIVELY FAILING HOT MELT PRESSURE SENSITIVE ADHESIVE

This application is a Continuation-In-Part of Application Ser. No. 08/676,864, filed Jul. 3, 1996, now U.S. Pat. No. 5,741,840.

FIELD OF THE INVENTION

This invention relates to a hot melt pressure sensitive adhesive comprising a block copolymer having a high diblock content, a low melt point styrene domain associating resin and a plasticizer. Preferably, the block copolymer is a fully saturated linear block copolymer having styrene endblocks and ethylene/butylene or ethylene/propylene midblocks. Specifically, this invention relates to a hot melt adhesive which fails cohesively during use.

BACKGROUND OF THE INVENTION

Hot melt pressure sensitive compositions are used widely in the adhesive industry due to their ability to adhere to a wide variety of substrates. Block copolymers are a preferred base polymer because of their elastomeric properties, their ability to be tackified, their compatibility with a wide range of tackifiers and plasticizers, and their high cohesive strength. Block copolymers are also popular because of the wide variety of grades available with varying molecular weights, styrene contents, coupling efficiencies and types of midblocks. The block copolymers most widely used have styrene endblocks, but the amount of styrene being present in varying amounts. Representative examples of midblocks most often encountered include isoprene, butadiene, ethylene/butylene and ethylene/propylene.

A primary property of a hot melt pressure sensitive composition is that it remains tacky at room temperature and can be adhered to substrates after it has completely cooled from its molten state. Block copolymers by themselves are inherently nontacky and it is necessary to use tackifying resins and plasticizers to develop the tack necessary for pressure sensitive adhesion.

Pressure sensitive adhesives are utilized for various applications including, but not limited to, labels, tapes, and packaging.

Block copolymers generally exhibit high cohesive strength resulting in adhesives that have high cohesive strength. While high cohesive strength is desirable for most applications such as for tapes and labels, this may not always be the requirement. Cohesive failure is a desirable property for such applications as seal/reseal in the packaging industry. This type of package is peelable and reclosable indicating that it's easy for a consumer to open initially, and it may be resealed later either through use of mechanical means or through an adhesive for instance. This type of package may be utilized for perishable goods.

The films utilized for manufacturing seal/reseal type packages are generally polymeric in nature and may comprise polyethylene, polypropylene, polyvinyl chloride, polyester, and acrylonitrile-methyl acrylate copolymer polymerized and/or mixed with butadiene as a terpolymer. The problem encountered with block copolymer based products for seal/reseal applications of this nature is that the adhesive generally remains on one side of the container or the other due to the fact that the internal strength of the adhesive is as high or slightly higher than the bond strength or peel adhesion to the substrate. This results in stringing of the adhesive as it has a tendency to remain on the package, but also to stay associated with itself. The adhesive therefore does not remain adhered to the substrate as intended, but strings in an attempt to remain with both resulting in what is known in the art as "adhesive confusion."

There is prior art that describes the use of a higher cohesive strength adhesive that remains associated preferentially with one side of the package and does not fail cohesively. This is an attempt to alleviate the problem of stringing of the adhesive but it does not, however, solve the problem of "adhesive confusion," as the internal strength of the adhesive is only slightly higher than the peel adhesion to the substrate.

U.S. Pat. No. 4,096,203 to St. Clair teaches a low cohesive strength hot melt adhesive employing either a styrene-butadiene-styrene(SBS) block copolymer or a styrene-isoprene-styrene(SIS) block copolymer. SBS and SIS block copolymer based adhesives are known to exhibit poorer thermal stability, and also exhibit an odor that is not as desirable for the packaging of perishables such as food.

The current inventors have found a solution to the aforementioned problems by employing hot melt pressure sensitive adhesives based on block copolymers having a high diblock content which fails cohesively during use.

SUMMARY OF THE INVENTION

The present invention relates to a hot melt pressure sensitive adhesive comprising a) from about 15% to about 40% by weight of a block copolymer having a coupling efficiency of less than about 75%; b) from about 20% to about 50% by weight of a tackifying resin selected from the group consisting of those tackifying resins having a softening point of less than about 100° C.; c) from about 30% to about 50% by weight of a plasticizing oil; and d) up to about 15% of a compatible polymer wherein the total polymer content does not exceed about 40% by weight of the adhesive. This hot melt pressure sensitive adhesive fails cohesively during use.

Preferably, the block copolymers employed are fully saturated linear block copolymers having styrene endblocks and ethylene/butylene or ethylene/propylene midblocks. The block copolymers comprise from about 15% to about 45% styrene by weight of the block copolymer, preferably from about 15% to about 35% styrene by weight of the block copolymer and more preferably from about 15% to about 25% styrene by weight of the block copolymer.

These adhesives are characterized by viscosities of less than about 5000 cPs at 175° C., preferably less than about 5000 cPs at 150° C. and more preferably viscosities of less than about 2500 cPs at 150° C., T-peel values of less than about 5 lbs/inch or 1 kg/cm when measured using an Instron® and softening points of between about 65° C. and 85° C. The adhesives are further characterized by having excellent thermal stability and low odor.

These adhesives are useful where a seal/reseal or peelable/reclosable type of closure is needed. The packaging industry uses seal/reseal containers for perishables such as cheese and meat. Such containers are often polymeric and are made from polyethylene, polypropylene, polyester, polyvinyl chloride, and acrylonitrile-methyl acrylate copolymer polymerized and/or mixed with butadiene for instance. The adhesives exhibit excellent adhesion to these difficult to bond substrates.

The low viscosities also allow for low application temperatures for heat sensitive substrates. The temperature of application for the adhesives is preferably between about 120° C. and about 165° C.

The low cohesive strength combined with excellent adhesion allows for a good seal prior to opening, but a low opening force, and a smooth peel with a lack of stringing or legging exhibited upon opening the package. The adhesives are inherently tacky and allow for a reseal of the package so that perishables may stay fresher, and offer further benefit due to the low odor. A further advantage is that these adhesives may be made for tamper evident packaging if it is desired.

DETAILED DESCRIPTIONS OF THE PREFERRED EMBODIMENTS

The block copolymers useful herein include linear triblock copolymers having the general configuration A-B-A and linear diblock copolymers having the general configuration A-B. The A block is styrene and the B block may be isoprene, butadiene, ethylene/butylene, ethylene propylene and mixtures thereof. Preferably, the B block is ethylene/butylene, ethylene/propylene and mixtures thereof. The coupling efficiency is less than about 75% and preferably less than about 65%. The coupling efficiency refers to the amount of triblock present as compared to the amount of diblock present in the polymer. The styrene content of the block copolymers is from about 15% to about 45% by weight of the block copolymer, preferably from about 15% to about 35% by weight and more preferably from about 15% to about 25% by weight and the melt index is commonly less than about 100 g/10 minutes and more commonly less than about 75 g/10 minutes. In contrast to adhesive compositions having low diblock content, the adhesives of the present invention have high concentrations of diblock which is surmised to decrease the cohesive strength, allowing such compositions to fail cohesively consistently. The adhesive remains in about equal amounts on each substrate to which it is bonded, without stringing. This further means that it leaves an even coating on each substrate and not that it leaves some parts of the original bond line without any adhesive. It is also surmised that increasing the styrene content of the block copolymer increases the stiffness and decreases flexibility in the finished product, which may be detrimental to the cohesive failure property as well as to cold temperature resistance. The adhesives of the present invention are especially suitable for the storage of perishable food items as well as for shipping products in general.

While styrene-isoprene-styrene and styrene-butadiene-styrene block copolymers are contemplated for use in the present invention, the thermal stability, color and odor is generally found to be inferior to that of styrene-ethylene/butylene-styrene block copolymers and styrene-ethylene/propylene-block copolymers. While the latter will be more desirable for use in applications in the food and cosmetic industries, for example, other midblocks may be utilized for other applications where these characteristics are not as important.

Examples of useful polymers include Kraton® G1726, a linear A-B diblock copolymer with a 30% coupling efficiency, and Kraton® G1657, a linear A-B-A triblock copolymer with a 70% coupling efficiency. Styrene-ethylene/propylene-styrene copolymers are manufactured by Kuraray Co., Ltd in Tokyo, Japan under the tradename of Septon®. Increasing the diblock content of the block copolymer is surmised to increase the internal cohesive strength of the block copolymer and hence decreases the cohesive strength of the final composition, resulting in products that fail adhesively from substrates rather than cohesively. Increasing the styrene content results in a stiffer, less flexible block copolymer which ultimately results in less cold temperature resistance of the finished product. These high diblock block copolymers are useful from about 15% to about 40% by weight of the adhesive and preferably from about 15% to about 30% by weight of the adhesive.

Tackifying resins which primarily associate with the styrene endblocks are useful in the present invention. Representative examples include liquid aromatic hydrocarbon resins and vinyl toluene, alpha-methylstyrene and rosin and rosin derivative resins having a softening point of less than about 100° C. and more preferably less than about 75° C., and mixtures thereof. Examples of useful resins include Kristalex® 3070 and Kristalex® 1085, alpha-methylstyrene resins having softening points of about 70° C. and 85° C. respectively available from Hercules in Wilmington, Del.; Foral® AX, a hydrogenated rosin acid having a softening point of about 75° C. and an acid number of 158 available from Hercules; Regalrez® 1018, a liquid cycloaliphatic hydrocarbon resin with a pour point of 18° C. available from Hercules; Piccolastic® A-5, a liquid cycloaliphatic hydrocarbon resin with a pour point of 5° C. available from Hercules; and Sylvatac® 5N, a liquid rosin ester with a pour point of 5° C. available from Arizona Chemical Co. located in Panama City, Fla. Increasing the melting point of the tackifying resin results in a more cohesive final composition that fails adhesively rather than cohesively from the substrates to which it may be adhered. The tackifying resins are useful in amounts of between about 20% to about 50% by weight of the adhesive, preferably from about 20% to about 40% by weight of the adhesive and more preferably from about 25% to about 40% by weight of the adhesive. Tackifying resins provide adhesion, and decreasing the level of tackifier may result in poor adhesion, especially to polyolefin substrates. Increasing the level of tackifying resin typically increases the glass transition temperature of the finished adhesive and may result in an adhesive that is too hard, has poor cold temperature resistance and fails adhesively.

Plasticizers, which are typically fluid, are necessary to the present invention. Plasticizers provide fluidity to the adhesives and decrease the viscosity as well as lowering the glass transition temperature. Plasticizers may include oil and liquid elastomers, or any other material which flows at ambient temperatures and is compatible with the block copolymer. The plasticizers useful herein may include mineral and petroleum based hydrocarbon oils, polybutene, liquid elastomers, or functionalized oils such as glyceryl trihydroxyoleate or other fatty oils. The oils used are primarily hydrocarbon oils which are low in aromatic content and are paraffinic or napthenic in character. The oils are preferably low in volatility, transparent, and have as little color and odor as possible. This invention also contemplates the use of olefin oligomers, low molecular weight polymers, vegetable oils and their derivatives and similar plasticizing liquids.

Examples of useful plasticizers include Calsol® 5120, a naphthenic petroleum based oil available from Calumet Lubricants Co. in Indianapolis, Ind.; Kaydol® White Mineral Oil, a paraffinic mineral oil available from Witco Corp. in New York, N.Y.; Parapol® 950 and 1300, liquid butene homopolymers available from Exxon Chemical Co. in Houston, Tex.; and Indopol® H-50, H-100, and H-300, liquid butene homopolymers, available from Amoco Corp. in Chicago, Ill. One skilled in the art would recognize that any generic 500 second or 1200 second naphthenic process oil would also be useful. These plasticizers are useful in amounts of from about 30% to about 50% by weight of the adhesive, preferably from about 35% to about 50% by weight of the adhesive and more preferably from about 40% to about 50% by weight of the adhesive. Lower levels of plasticizer can increase the glass transition temperature of the finished adhesive, and may result in an adhesive that is too hard, has poor cold temperature resistance and fails adhesively. The viscosity of the adhesive may also be too high resulting in poor machinability. It is surmised that higher levels of plasticizer may result in plasticizer migration due to the fact that low levels of polymer and polymers with high diblock contents cannot retain as much plasticizer in the system. Such migration may result in poor adhesion.

The present inventors envision that any compatible polymers would be useful providing that the resultant product fails cohesively from the substrate to which it is adhered. Compatibility refers to a lack of phase separation in the finished composition. This generally means that the product will predominantly comprise a high diblock content block copolymer as a percent of the total polymer concentration.

The compatible polymers useful herein may include A-B-A triblock copolymers, A-B diblock copolymers, A-B-A-B-A-B multiblock copolymers, and radial block copolymers, and grafted versions thereof; homopolymers, copolymers, and terpolymers of ethylene; and propylene. Usefull block copolymers having the general configuration A-B-A, having styrene endblocks and ethylene-butadiene midblocks, are described in U.S. Pat. No. 4,136,699 to Collins et al. These polymers are available under the tradename of Kraton® G commercially available from Shell Chemical Co., located in Houston, Tex. One skilled in the art would recognize that there are various grades of Kraton® G available for use. Some examples include Kraton® G-1652, and Kraton® G-1650, saturated A-B diblock/A-B-A triblock mixtures with ethylene-butadiene midblocks; Kraton® D-1112, a high percent A-B diblock linear styrene-isoprene-styrene polymer; Kraton® D-1107 and D-1111, primarily A-B-A triblock linear styrene-isoprene-styrene polymers; Stereon® 841A, an A-B-A-B-A-B multiblock styrene-butadiene-styrene polymer available from Firestone located in Akron, Ohio; Europrene® Sol T 193B a linear styrene-isoprene-styrene polymer available from Enichem Elastomers in New York, N.Y.; Europrene® Sol T 163, a radial styrene-butadiene-styrene polymer also available from Enichem Elastomers; Vector® 4461-D, a linear styrene-butadiene-styrene polymer available from Exxon Chemical Co. in Houston, Tex.; Vector® 4111, 4211, and 4411, fully coupled linear styrene-isoprene-styrene polymers containing different weight percentages of styrene endblock; and Vector® 4113, a highly coupled linear styrene-isoprene-styrene polymer also available from Exxon Chemical Co. This list is not inclusive, and there are many other grades of block copolymers that are available which are known to those of skill in the art, and would be contemplated by this invention.

Other useful polymers include homopolymers, copolymers and terpolymers of ethylene, and polypropylene. Some examples include ethylene vinyl acetate copolymers available from DuPont Chemical Co. located in Wilmington, Del. under the tradename of Elvax® including, for instance, Elvax® 210 which has a melt index of 400 grams/10 minutes and a vinyl acetate content of 28% by weight in the copolymer, Elvax® 205W which has a melt index of 800 and a vinyl acetate content of about 28% by weight in the copolymer and Elvax® 410 which has a melt index of 500 and a vinyl acetate content of about 18% by weight. Other ethylene vinyl acetate copolymers are available from Exxon Chemical Co. under the tradename of Escorene® including UL 7505 and also from Millennium Petrochemicals in Rolling Meadows, Ill. under the tradename of Ultrathene® including UE 64904 and AT® copolymers available from AT Polymers & Film Co. in Charlotte, N.C. including AT® 1850M. There are numerous other grades of ethylene vinyl acetate copolymers available from a variety of chemical companies. Other useful copolymers include ethylene n-butyl acrylate copolymers available from Elf Atochem North America in Philadelphia, Pa. under the tradename of Lotryl®, from Exxon Chemical Co. under the tradename of Escorene® including XW-23.AH which has a melt index of about 330 grams/10 minutes and an n-butyl acrylate content of about 33% by weight in the copolymer and XW-22.AH which has a melt index of about 900 and an n-butyl acrylate content of about 35% by weight and from Millennium Petrochemicals under the tradename of Enathene® including EA 89822 which has a melt index of about 400 grams/10 minutes and a n-butyl acrylate content of about 35% by weight in the copolymer. Ethylene methyl acrylate copolymers are also useful and are available from Exxon Chemical Co. under the tradename of Optema® including Optema® XS 93.04 which has a melt index of about 270 grams/10 minutes and a methyl acrylate content of about 20% by weight in the copolymer. Other useful polymers include ethylene n-butyl acrylate carbon monoxide copolymers from DuPont under the tradename of Elvaloy®, amorphous poly-alphaolefin polymers from Rexene Products Co. in Dallas, Tex. under the tradename of Rextac® and from Eastman Chemical Co. under the tradename of Eastoflex® and polyethylene homopolymers from Eastman Chemical Co. under the tradename of Epolene®.

Other useful polymers include Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. located in Midland, Mich.

All of these compatible polymers are useful from about 0% to about 15% by weight of the adhesive.

A stabilizer or antioxidant is also preferably used in hot melt adhesives. These compounds are added to protect the adhesive from degradation caused by reaction with oxygen induced by such things as heat, light, or residual catalyst from the raw materials such as the tackifying resin. Such antioxidants are commercially available from Ciba-Geigy in Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

These adhesives are characterized by low viscosities of less than about 5000 cPs at about 175° C., preferably less than about 5000 cPs at about 150° C. and more preferably less than about 2500 cPs at about 150° C., and softening points of between about 65° C. and about 85° C. The low viscosities allow for low temperatures of application of between about 120° C. and 165° C. The low softening points allow for low heat seal temperatures which is important when heat sealing containers made from heat sensitive thermoplastic materials. A recent trend in the packaging industry has been to go with lower gauge thermoplastic films which are more heat sensitive.

T-peel values as measured on an Instron® are less than about 5 lbs/inch or 1 kg/cm. The adhesives of the present invention have excellent adhesion to thermoplastic materials such as polyethylene, polypropylene, polyester, polyvinyl chloride, and acrylonitrile-methyl acrylate copolymer polymerized and/or mixed with butadiene for instance. The low peel strength and excellent adhesion combine to allow for an easy opening force of packages and cohesive failure without stringing or legging. Stringing or legging refers to the undesirable characteristic of the adhesive staying on each substrate or on both sides of a package without cleanly remaining with either side. This is particularly useful for the seal/reseal or peelable/reclosable type packages that are popularly used for perishables, especially in the food packaging industry. Containers may be opened and reclosed to keep food items fresher. The initial seal is generally referred to as a hermetic, or gas tight seal. This is to maintain the freshness of the goods. Many packages do not allow for reclosure of the seal, however, which is a disadvantage when it is desirable to keep the packaged goods fresh. This lack of a reseal ability would then require that the goods be transferred to another container. Due to the pressure sensitive nature of the hot melts of the present invention, packages can be hermetically sealed initially, opened, and resealed later.

These seals may be formed in production using a variety of applications. However, it is most common that the adhesive would be initially applied to the body or base of a container, the container is then filled with product, and then the top or lid of the container is heat sealed to the base or body. The initial application temperature of these adhesives is between about 120° C. to about 165° C. Heat seal conditions may vary with different equipment, but generally application temperatures are between about 65° C. to about 100° C., dwell times are between about 1 second to about 10 seconds, and airline pressures are between about 50 psi to 150 psi. Application temperatures are necessarily higher than heat seal temperatures due to the fact that application equipment requires low viscosities for good application of the hot melt without stringing or clogging of nozzles, and adhesion of hot melt adhesives decreases as the temperature is decreased.

The adhesive, once applied, remains bonded to both sides of the package and allows for a low opening force, and no stringing by the adhesive as the package is opened.

This invention is further illustrated by the following non-limiting examples.

EXAMPLES

Test Methods

1. Melt Viscosities

The melt viscosities of the hot melt adhesives were determined on a Brookfield Thermosel Viscometer Model DVI using a number 21 spindle.

2. T-Peel Testing

The adhesive samples were heated to between about 90° C. and 95° C. and drawn onto a rigid polyethylene sheet using a drawn down bar supplied from Paul N. Gardner Co. Inc. located in Pompano Beach, Fla. using a 4 mil or 100 g/in²±20g/in² coat weight. The coated material is then allowed to dwell for a minimum of 16 hours. Samples are cut from the material in 2.54 cm×12.7 cm (1"×5") segments. An uncoated 2.54 cm×12.7 cm (1"×5") strip is then placed onto the coated material and the layers are then heat sealed using a Sentinel heat sealer with 90 psi air line pressure, a 4 second dwell time, and a heat seal temperature of about 75° C. The bonds are allowed to dwell for a minimum of 4 hours, and then T-peel values are determined using an Instron® with a crosshead speed of 10"/minute.

3. 180° Peels

The samples are prepared as they are for T-Peel testing. The 180° peels are run on an Adhesion/Release Tester AR-100 manufactured by Chem Instruments in Fairfield, Ohio.

These examples were prepared using an upright mixer, known also in the industry as a lightening mixer, such as the Stirrer Type RZRI manufactured by Caframo in Wiarton, Ontario, Canada. Using this method, all of the components, except the block copolymers or other compatible polymers, were melted first in an oven at a temperature of about 175° C. and then the polymer(s) were slowly added and blended until smooth and homogeneous.

The adhesives may also be prepared using a high shear sigma blade mixer such as those manufactured by Littleford Day located in Florence, Ky. Using this method, the mixer may be charged with some of the tackifier and/or oil until molten. The polymer(s) are then slowly added to the mixer and blended until smooth and homogeneous. The remaining tackifying resin and oil, if any, is then slowly added. Many variations of this procedure are possible, and in fact, all of the components can be added to the mixer at once and blended until smooth. The order of addition is not critical. The temperature for both methods is between about 150° C. and 175° C.

There are other commercially available methods of manufacturing these adhesives.

TABLE 1

| Examples % by weight of the adhesive | 1 | 2 | 3 | 4 |
|---|---|---|---|---|
| Kraton G1726 (70% diblock SEBS) | 20.0 | 20.0 | 22.5 | 25.0 |
| Kristalex 3070 (alphamethyl styrene resin) | 40.0 | 30.0 | 27.5 | 25.0 |
| Regalrez 1018 (liquid hydrocarbon resin) | — | 5.0 | 5.0 | 7.5 |
| Kaydol Oil (white paraffinic mineral oil) | 39.5 | 44.5 | 44.5 | 42.0 |
| Irganox 1010 (hindered phenolic antioxidant) | 0.5 | 0.5 | 0.5 | 0.5 |
| Failure Type | Coh | Coh | Coh | Coh |

Table 1 illustrates the cohesive failure of several compositions of the invention.

TABLE 2

| Examples % by weight of the adhesive | 5 | 6 | 7 | 8 | 9 | 10 | 11 | 12 |
|---|---|---|---|---|---|---|---|---|
| Kraton G1726 (70% diblock SEBS) | 16.0 | 21.0 | 21.0 | 21.0 | 21.0 | 20.0 | 20.0 | 24.0 |
| Kristalex 3070 (alpha-methyl styrene resin) | 36.0 | 21.0 | 21.0 | 21.0 | 21.0 | 17.0 | 24.0 | 20.5 |
| Foral AX (rosin acid resin) | — | 10.0 | 10.0 | 10.0 | 10.0 | 10.0 | 5.0 | 5.0 |
| 500 second Process Oil | 42.5 | 42.5 | 42.5 | 42.5 | 42.5 | 42.5 | 40.0 | 40.0 |
| Exxpol 394 (interpolymer of ethylene and at least one alpha-olefin) | 5.0 | 5.0 | — | — | — | — | — | — |
| EVA (28-400) | — | — | 5.0 | — | — | — | — | — |
| EVA (18-500) | — | — | — | 5.0 | — | — | — | — |
| Enathene ® EA 89822 EnBA (35-400) | — | — | — | — | 5.0 | 10.0 | 5.0 | 10.0 |
| Irganox 1010 (hindered phenolic anti-oxidant) | 0.5 | 0.5 | 0.5 | 0.5 | 0.5 | 0.5 | 0.5 | 0.5 |
| Failure Type | Coh | Coh | Coh | Coh | Coh | Coh | Coh | Coh |

Table 2 illustrates the cohesive failure of compositions utilizing a compatible polymer.

TABLE 3

| Examples % by weight of the adhesive | 13 | 14 | 15 | 16 |
|---|---|---|---|---|
| Kraton G1726 (70% diblock SEBS) | 23.0 | 21.0 | 22.0 | 22.0 |
| Kristalex 3070 (alphamethyl styrene) | 31.0 | 36.0 | 37.0 | 36.0 |
| 500 sec Process Oil | 45.5 | 42.5 | 40.5 | 41.5 |
| Irganox 1010 (hindered phenolic antioxidant) | 0.5 | 0.5 | 0.5 | 0.5 |
| Type of Failure | Coh | Coh | Coh | Coh |
| 180° Peel (#/in² Avg.) | 1.5 | 1.7 | 2.0 | 3.2 |

Table 3 illustrates both the cohesive failure of compositions of the invention, and the low peel values obtained which allow for an easy opening force when the compositions are utilized on packages.

TABLE 4

| Example % by weight of the adhesive | 17 | 18 | 19 | 20 | 21 | 22 | 23 |
|---|---|---|---|---|---|---|---|
| Kraton G1726 (70% diblock SEBS) | 20.0 | 21.0 | 20.0 | 22.0 | 18.0 | 24.0 | 21.0 |
| Kristalex 3070 (alpha-methyl styrene) | 24.5 | 28.5 | 24.5 | 24.5 | 24.5 | 24.5 | 28.5 |
| Foral AX (rosin acid resin) | 5.0 | 5.0 | 5.0 | 5.0 | 5.0 | 5.0 | 5.0 |
| 500 second Process Oil | 40.0 | 40.0 | 40.0 | 40.0 | 40.0 | 40.0 | 40.0 |
| EnBA (35-400) | — | — | 10.0 | 8.0 | 12.0 | 6.0 | 5.0 |
| EVA (28-400) | 10.0 | 5.0 | — | — | — | — | — |
| Irganox 1010 (hindered phenolic antioxidant) | 0.5 | 0.5 | 0.5 | 0.5 | 0.5 | 0.5 | 0.5 |
| Type of Failure | Coh | Coh | Coh | Coh | Coh | Coh | Coh |
| T-Peel | 0.7 | 1.00 | 0.5 | 0.8 | 0.3 | 1.7 | 1.3 |

Table 4 illustrates the cohesive failure of formulas utilizing a compatible polymer, and also illustrates the low T-peel values obtainable which allow an easy opening force when the compositions are utilized on packages.

TABLE 5

| Examples % by weight of the adhesive | 14 | 15 | 18 | 20 |
|---|---|---|---|---|
| Kraton G1726 | 21.0 | 22.0 | 21.0 | 22.0 |
| Kristalex 3070 | 36.0 | 37.0 | 28.5 | 24.5 |
| Foral AX | — | — | 5.0 | 5.0 |
| 500 sec Process Oil | 42.5 | 40.5 | 40.0 | 40.0 |
| EnBA(35–400) | — | — | — | 8.0 |
| EVA(28–400) | — | — | 5.0 | — |
| Irganox 1010 | 0.5 | 0.5 | 0.5 | 0.5 |
| Viscosity @ | | | | |
| 121° C. (250° F.) | 1,265 | 1,775 | 1,480 | 2,060 |
| 149° C. (300° F.) | 390 | 500 | 470 | 670 |

Table 5 illustrates the low viscosities obtained with the compositions of the invention.

TABLE 6

| Comparative Examples A–D | | | | |
|---|---|---|---|---|
| Examples % by weight of the adhesive | A | B | C | D |
| Kraton G1652 100% linear SEBS | 24.0 | 12.0 | 5.0 | — |
| Kraton G1726 70% diblock SEBS | — | 12.0 | — | 15.0 |
| Kraton G1657 35% diblock SEBS | — | — | 15.0 | — |
| Enathene EA 89822 35-400 ethylene n-butyl acrylate copolymer | 10.0 | 10.0 | — | — |
| Rextac RT 2535 amorphous polyalphaolefin | — | — | — | 22.5 |
| Kristalex 3070 alphamethyl styrene resin | 20.5 | 20.5 | — | — |
| Foral AX hydrogenated rosin acid | 5.0 | 5.0 | — | — |
| Eastotac H130F cycloaliphatic hydrocarbon resin | — | — | 25.0 | — |
| Zonatac 85L styrenated terpene resin | — | — | — | 29.5 |
| 500 Second Process Oil | 40.0 | 40.0 | 54.79 | — |
| Kaydol White Mineral Oil (paraffinic) | — | — | — | 32.79 |
| Ethanox R330 hindered phenolic antioxidant | — | — | 0.2 | 0.2 |
| Uvitex OB fluorescing agent | — | — | 0.01 | 0.01 |

TABLE 6-continued

Comparative Examples A–D

| | Examples % by weight of the adhesive | | | |
|---|---|---|---|---|
| | A | B | C | D |
| Irganox 1010 (hindered phenolic antioxidant) | 0.5 | 0.5 | — | — |
| Type of Failure | ADH | ADH | ADH | ADH |

Comparative Example A illustrates the use of a linear SEBS block copolymer having no diblock content. Example A exhibited 100% adhesive failure.

Comparative Example B also illustrates the use of a linear SEBS block copolymer having no diblock content in combination with a 70% diblock content SEBS block copolymer. This example exhibited 50% adhesive failure and some undesirable stringing.

Comparative Example C illustrates the use of a 130° C. melting point cycloaliphatic hydrocarbon resin. This example also exhibited adhesive failure.

Comparative Example D illustrates the use of a high amount of an amorphous polyalphaolefin (polypropylene) polymer. This example also exhibited mostly adhesive failure.

What is claimed is:

1. A hot pressure sensitive adhesive comprising:
   a) about 20% to about 40% by weight of the adhesive of at least one block copolymer selected form the group consisting of block copolymers having styrene endblocks and ethylene/butylene midblocks, block copolymers having styrene endblocks and ethylene/propylene midblocks and mixtures thereof wherein said block copolymer has a styrene content from about 15% to 35% by weight of the block copolymer and a coupling efficiency of less than about 75%;
   b) from about 20% about 50% by weight of the adhesive of a tackifying resin having a softening point of less than about 100° C.;
   c) from about 30% to about 50% by weight of the adhesive of a plasticizing oil;
   d) from about 0 to about 15% by weight of the adhesive of a second compatible polymer such that the total polymer content does not exceed 40% by weight of the adhesive;
   wherein the hot melt adhesive fails cohesively during use without stringing.

2. The process of making the adhesive of claim 1 comprising the steps of:
   a) melting the adhesive components; and
   b) blending the adhesive components in a mixing unit until smooth and homogeneous;
   wherein the melting and blending of each component may occur in any order of addition.

3. The adhesive of claim 1 wherein the viscosity is less than about 2,500 cPs at 150° C.

4. The adhesive of claim 1 wherein the T-peel force as measured on an Instron® is less than about 1 kg/cm.

5. The adhesive of claim 1 wherein the compatible plasticizer is selected from the group consisting of napthenic process oil, paraffinic process oil, polybutene, liquid elastomers and mixtures thereof.

6. The adhesive of claim 1 wherein the tackifier is selected from the group consisting of liquid aromatic hydrocarbons, vinyl toluene, alpha-methyl styrene, rosins and rosin esters, and mixtures thereof having a softening point of less than about 100° C.

7. The adhesive of claim 1 wherein said second compatible polymer is selected from the group consisting of homopolymers, copolymers and terpolymers of ethylene; homopolymers, copolymers and terpolymers of propylene; rubbery block copolymers and mixtures thereof.

8. The adhesive of claim 7 wherein said second compatible polymer is selected from the group consisting of ethylene n-butyl acrylate, ethylene methacrylate, and vinyl acetate copolymers.

9. The hot melt pressure sensitive adhesive of claim 1 comprising from about 15% to about 25% by weight of the adhesive of a block copolymer having a coupling efficiency of less than about 75%; from about 30% to about 40% by weight of the adhesive of an tackifying resin selected from the group of vinyl toluene and alpha-methylstyrene having a softening point of less than about 75° C.; from about 35% to about 45% by weight of the adhesive of a naphthenic process oil; and from about 5% to about 15% by weight of the adhesive of a compatible polymer selected from the group consisting of ethylene n-butyl acrylate, ethylene methacrylate, and ethylene vinyl acetate.

10. A hot melt pressure sensitive adhesive comprising:
    a) from about 15% to about 40% by weight of the adhesive of a block copolymer having a coupling efficiency of less than about 75%;
    b) from about 20% to about 50% by weight of the adhesive of a tackifying resin having a softening point of less than about 100° C.;
    c) from about 30% to about 50% by weight of the adhesive of a plasticizing oil; and
    d) from about 5% to about 15% by weight of the adhesive of a copolymer selected from the group consisting of ethylene n-butyl acrylate copolymers, ethylene methyl acrylate copolymers, vinyl acetate copolymers, linear or substantially linear interpolymers of ethylene and at least one $C_3$ to $C_{20}$ alpha-olefin, and mixtures thereof;
    wherein the hot melt pressure sensitive adhesive fails cohesively during use.

11. A hot melt pressure sensitive adhesive comprising:
    a) about 20% to about 40% by weight of the adhesive of a block copolymer having and a coupling efficiency of less than about 75%,
    b) from about 20% to about 50% by weight of the adhesive of a tackifying resin having a softening point of less than about 100° C.;
    c) from about 30% to about 50% by weight of the adhesive of a plasticizing oil;
    d) from about 0 to about 15% by weight of the adhesive of a second compatible polymer such that the total polymer content does not exceed 40% by weight of the adhesive;
    wherein the hot melt adhesive fails cohesively during use on polyethene without stringing.

12. The hot melt adhesive of claim 11 wherein said second compatible polymer is selected from the group consisting of block copolymers; homopolymers, copolymers and terpolymers of ethylene; homopolymers, copolymers and terpolymers of propylene; interpolymers of ethylene and at least one α-olefin; and mixtures thereof.

13. The hot melt adhesive of claim 11 wherein said block copolymer comprises polystyrene blocks, has a styrene content from about 15% to about 25% by weight of the block copolymer, and has a coupling efficiency of about 65%.

14. The hot melt adhesive of claim 11 wherein said adhesive comprises from about 15% to about 25% of a block copolymer having a coupling efficiency of less than about 65%.

* * * * *